Aug. 8, 1950  E. C. JACKSON  2,517,671
RAILWAY TRUCK
Filed Aug. 29, 1947  4 Sheets-Sheet 1
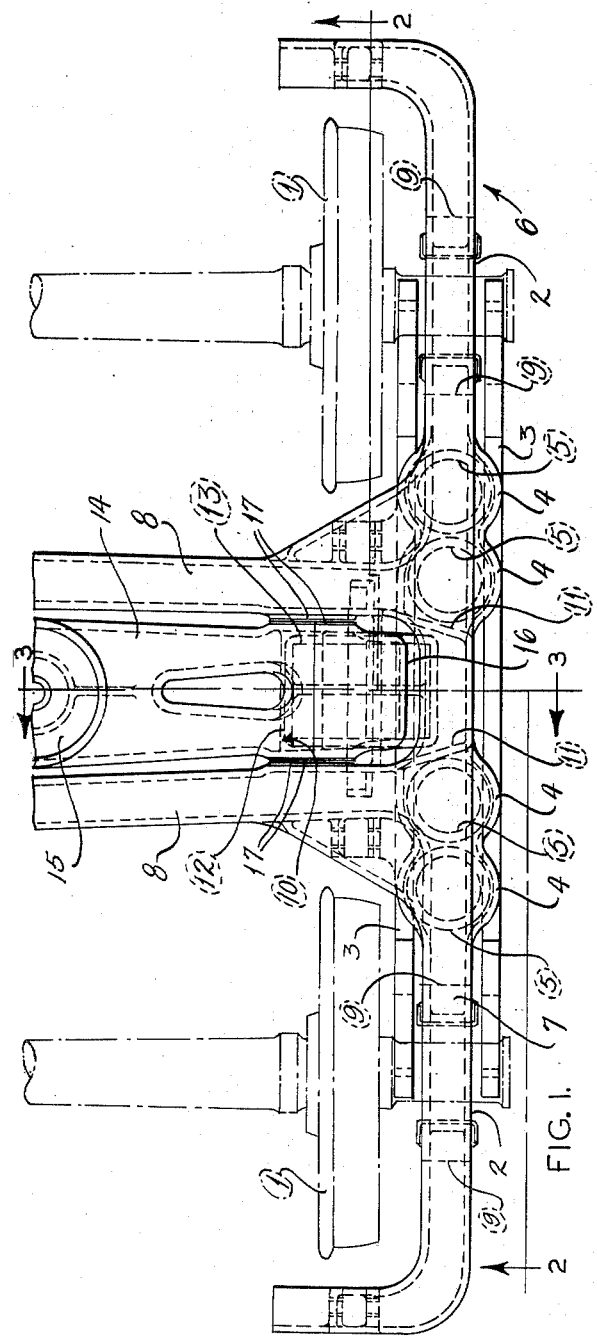
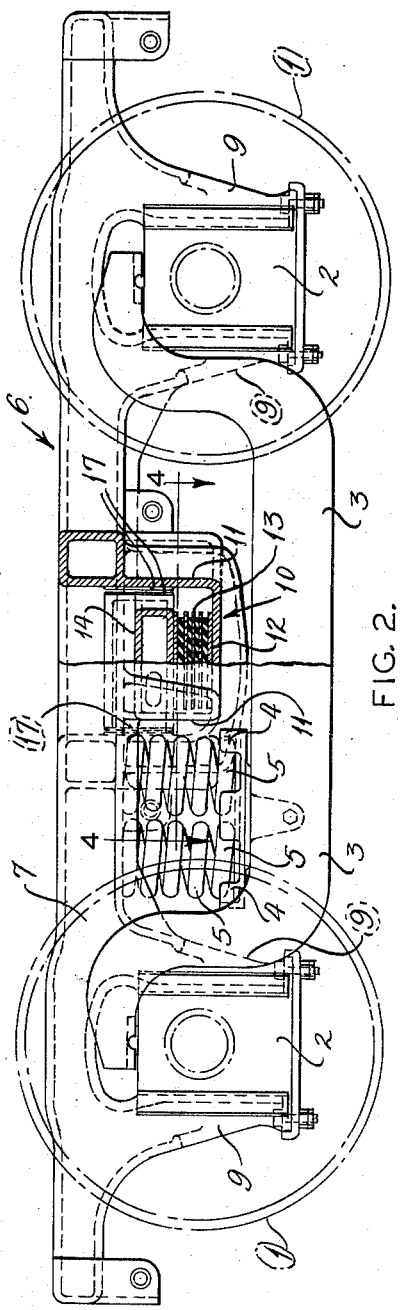
INVENTOR
EDWIN C. JACKSON
BY Rodney Bedell
ATTORNEY Aug. 8, 1950 E. C. JACKSON 2,517,671
RAILWAY TRUCK
Filed Aug. 29, 1947 4 Sheets-Sheet 2

INVENTOR:
EDWIN C. JACKSON
BY *Rodney Bedell*
ATTORNEY.

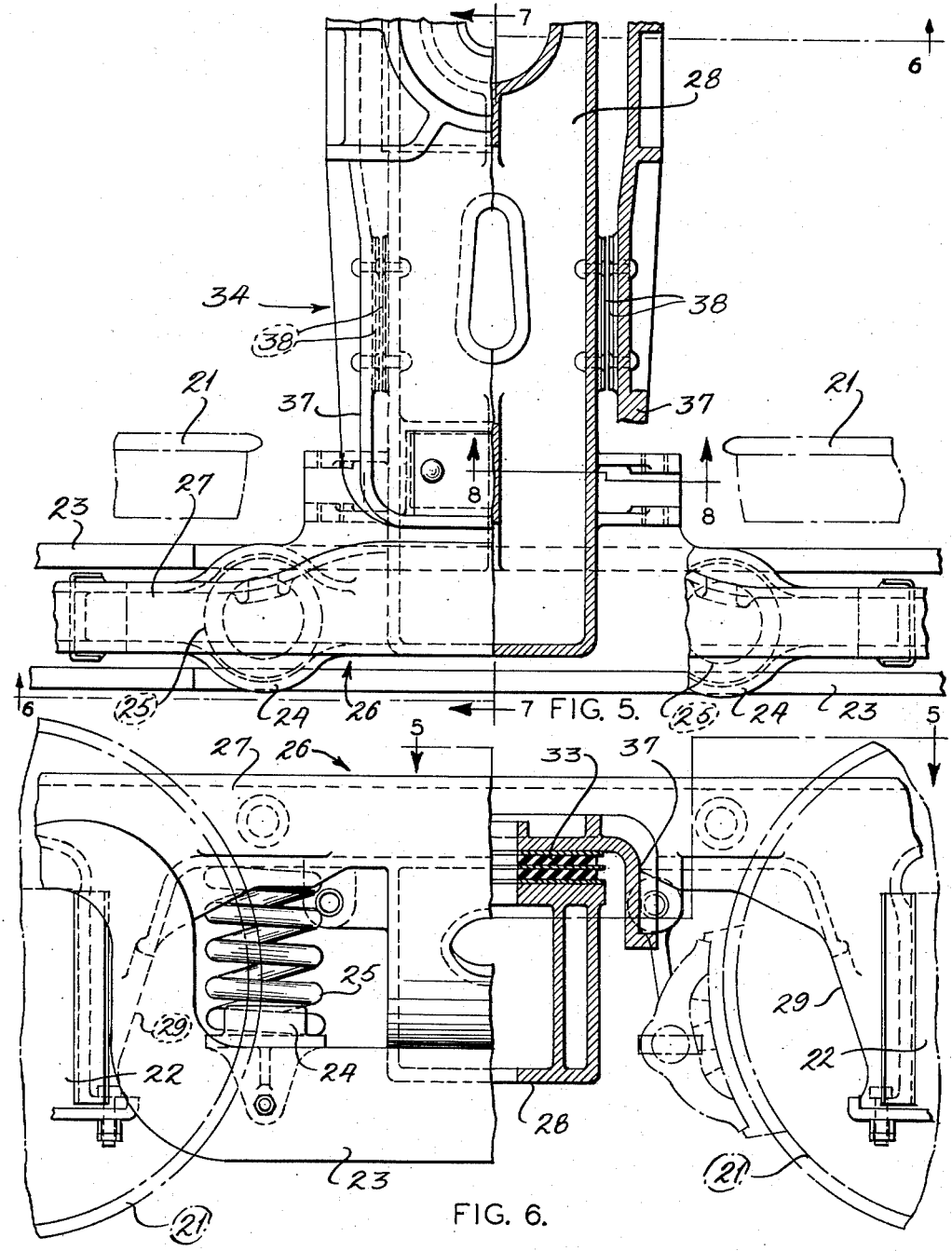

Patented Aug. 8, 1950

2,517,671

UNITED STATES PATENT OFFICE 2,517,671

RAILWAY TRUCK

Edwin C. Jackson, Clayton, Mo., assignor to General Steel Castings Corporation, Granite City, Ill., a corporation of Delaware Application August 29, 1947, Serial No. 771,234

3 Claims. (Cl. 105—197)

The invention relates to railway rolling stock and more particularly to railway trucks of the type in which the load supporting bolster is supported by the truck frame without the use of a spring plank and swing hangers, the support of the bolster being such that the bolster has movement laterally of the truck relative to the truck frame to accommodate track irregularities, alternate tangent and curved track and other conditions tending to create side thrusts between the vehicle body and truck.

The main object of the invention is to provide a simplified light weight truck having a rigid frame and a short wheel base and adapted for use in railway express, refrigerator, or other cars designed to be moved at high speeds in either passenger trains or fast freight trains.

Another object is to minimize the number of parts and to facilitate disassembly and repair.

A railway truck constructed according to the invention comprises the usual wheels, axles, equalizers and equalizer springs. The truck frame is mounted on the equalizer springs and includes wheel pieces and transverse framing rigidly connecting the wheel pieces. Yielding flat pads of rubber-like material are mounted on the truck frame and support the load supporting center plate structure, such as the truck bolster or truck center plate, and provide for movement of the center plate structure laterally relative to the truck frame. The yielding pads and center plate structure preferably are disposed on the transverse center line of the truck.

These and other detail objects as will appear below are obtained by the structure illustrated in the accompanying drawings, in which:

Figure 1 is a top view of a longitudinal half of a four-wheel railway truck constructed acording to the invention.

Figure 2 is in part a side view and in part a longitudinal vertical section taken approximately on the line 2—2 of Figure 1.

Figure 5 is in part a top view and in part a horizontal section on line 5—5 of Figure 6 of a portion of a longitudinal half of a four-wheel truck showing another form of the invention.

Figure 6 is in part a side view and in part a longitudinal vertical section on the longitudinal center line of the truck shown in Figure 5 as indicated by the line 6—6 in Figure 5.

Figure 3:
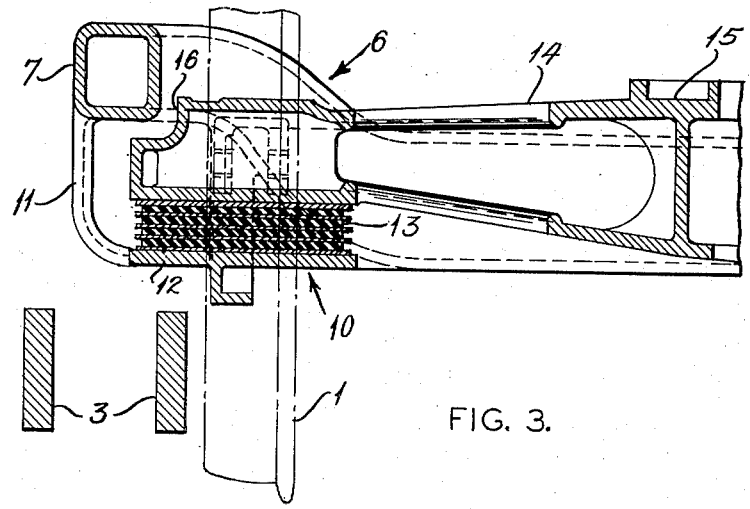
Figure 3 is a transverse vertical section, drawn to enlarged scale, taken approximately on the line 3—3 of Figure 1.
Figure 4:
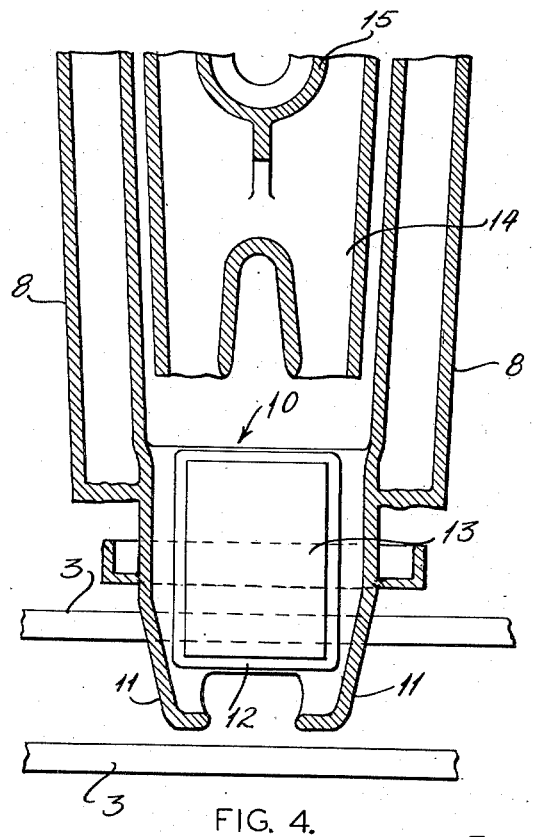
Figure 4 is a horizontal section, drawn to enlarged scale, taken approximately on the line 4—4 of Figure 2.
Figure 7:
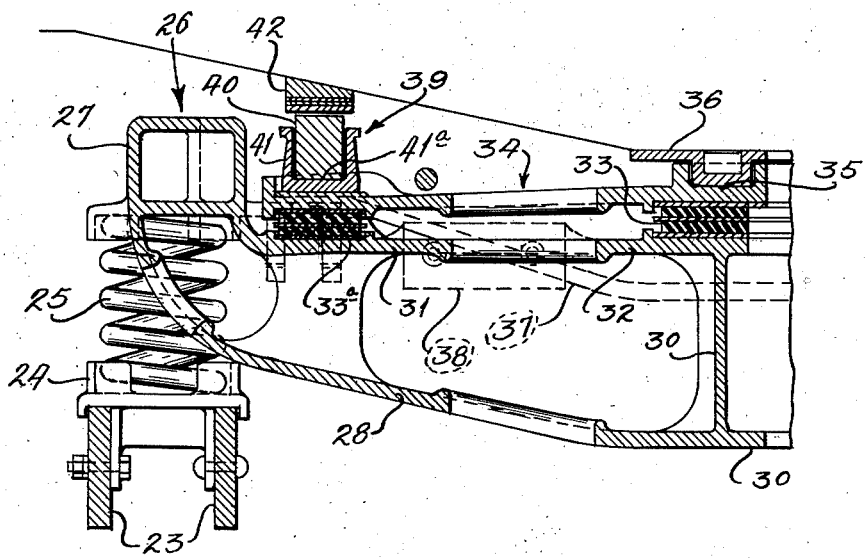
Figure 7 is a transverse vertical section taken approximately on the line 7—7 of Figure 5.

The truck shown in Figures 1-4 comprises the usual wheel and axle assemblies 1 and journal boxes 2. Double drop equalizers 3 extend between the journal boxes at each side of the truck and are provided with pairs of seats 4 at each side of the transverse center line of the truck for springs 5 resiliently supporting a truck frame 6. The truck frame includes wheel pieces 7 and spaced transverse transoms 8 rigidly connecting the wheel pieces. Pedestal legs 9 depend from wheel pieces 7 and receive journal boxes 2 between them. Each side of the truck frame includes a tie and support member 10 comprising arms 11 depending from the wheel piece and transoms and merging with a flat horizontal shelf 12 extending inwardly of the wheel piece and beneath the space between the transoms. A flat yielding pad 13 formed of alternate layers of rubber-like material and steel bonded together is carried on each shelf 12 and is disposed on the transverse center line of the truck. The center plate structure comprises a bolster 14 extending along the transverse center line of the truck and supported at its ends by pads 13. Bolster 14 includes a center plate 15 for co-action with a vehicle body center plate to accommodate relative swiveling in a horizontal plane between the vehicle body and truck. Pads 13 provide for movement of bolster 14 laterally relative to the truck frame to absorb lateral shocks applied between the rail and wheels, the rubber being placed in shear during the lateral movement of the bolster. The ends of bolster 14 are recessed at 16 to accommodate wheel pieces 7 and lateral movement of the bolster is limited by the recessed ends of bolster 14 engaging the wheel pieces. Chafing plates 17 are provided on the sides of the bolster and on the inner sides of the frame transoms to position the bolster longitudinally of the truck relative to the truck frame.

The truck shown in Figures 5-8 comprises the usual wheel and axle assemblies 21 and journal boxes (not shown). Double drop equalizers 23 extend between the journal boxes on each side of the truck and are provided with a seat 24 at each side of the truck center line for springs 25 yieldingly supporting the truck frame 26. The truck frame includes wheel pieces 27 and pedestal legs 29 depending therefrom and receiving the journal boxes between them. A transverse framing or transom 28 is rigid with wheel pieces 27 and extends along the transverse center line of the truck and between springs 25. Framing 28 comprises vertical and horizontal re-enforcing webbing 30 and horizontal portions 31 and 32 at its ends and center, respectively. Horizontal portions 31, 32 seat flat yielding pads 33 and 33a of alternate layers of rubber-like material and steel bonded together. The vehicle load is transmitted to framing 28 by a bolster member 34 extending from side to side of the truck over transom 28 and provided with a center plate 35 and with side bearings 39 at its ends. Bolster 34 is supported at its center directly below center plate 35 and at its ends by flat yielding pads 33 and 33a.

Pads 33 and 33a provide for lateral movement of the bolster relative to the truck frame. Lateral movement of the bolster is limited by the ends of the bolster engaging wheel pieces 27. The sides 37 of the bolster extend downwardly adjacent the sides of framing 28 to position the bolster longitudinally of the truck relative to the truck frame. Chafing plates 38 are provided on the sides 37 of the bolster and on framing 28.

Center plate 35 is arranged for coaction with a vehicle body center plate 36 in the usual manner and normally carries the entire vehicle body load.

Figure 8:
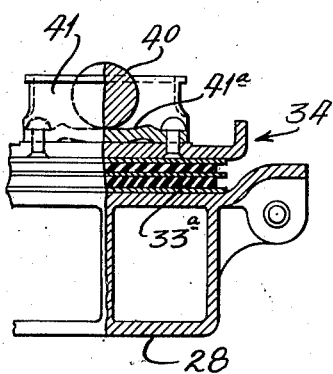
Figure 8 is a detail longitudinal vertical section taken approximately on line 8—8 of Figure 5.

Side bearings 39, positioned at each end of the bolster directly above pads 33a, limit tilting movement of the car body relative to the truck frame. Each side bearing 39 includes a roller 40 mounted between the upstanding legs of an elongated U-shaped housing 41 on the bolster 34 and is in position to engage a bearing element 42 on the car body. Roller 40 rolls on the base 41a of member 41 which is inclined toward its center in the direction of roller movement (Figure 8). The truck and body bearing elements make rolling contact with one another to facilitate swiveling action of the truck relative to the car body irrespective of the tilt of the car body relative to the truck.

When rubber pads support only the end portions of the bolster, as in Figures 1-4, the center portion of the bolster must be of heavier or deeper section than when a rubber pad is provided under the center plate portion of the bolster also, as in Figures 5-8, since a large portion of the bolster load in the later embodiment is transmitted directly from the center plate through pad 33 and then to the truck frame.

For this reason pads 33a at the ends of the bolster may be smaller than pad 33 under the center plate. The total areas of the rubber pads in both arrangements are approximately the same because the center plate load in both arrangements is approximately the same.

The trucks described are light in weight and have a short wheel base because of the elimination of swing hangers, cross-bars, spring planks and bolster springs, but nevertheless provide for lateral movement of the bolster relative to the frame. The truck frame is a rigid unit and unsquaring of the side frames is prevented.

The center plate structure may include the truck center plate and its lateral extensions normally comprising the bolster or it may consist of the truck center plate alone.

The details of the structure may be varied substantially without departing from the spirit of the invention, and the exclusive use of those modifications coming within the scope of the claims is contemplated.

What is claimed is:

1. In a railway truck, axles and journal boxes, equalizers extending longitudinally of the truck between said boxes, springs mounted on said equalizers, a truck frame mounted on said springs and including wheel pieces and transverse framing rigidly connecting said wheel pieces, a bolster having a center plate arranged for co-action with a vehicle body center plate, and bolster supporting pads of rubber-like material between said transverse framing and said bolster and located at the ends of said bolster and directly below said center plate and yielding in shear to lateral thrusts to accommodate movement of said bolster transversely of the truck relative to said frame.

2. In a railway truck, axles and journal boxes, equalizers extending longitudinally of the truck between said boxes, springs mounted on said equalizers, a truck frame mounted on said springs and including wheel pieces and transverse framing rigidly connecting said wheel pieces, a bolster including a center plate arranged for co-action with the vehicle body center plate, and flat pads of rubber-like material seated on said transverse framing and disposed at the ends and at the center of said bolster and supporting said center plate from said truck frame, said center pad being positioned directly below said center plate, said pads yielding in shear to lateral thrusts to accommodate movement of said bolster transversely of the truck relative to said frame.

3. In a railway truck, axles and journal boxes, equalizers extending longitudinally of the truck between said boxes, springs mounted on said equalizers, a truck frame mounted on said springs and including wheel pieces and transverse framing rigidly connecting said wheel pieces, a bolster having a center plate arranged for co-action with a vehicle body center plate, a side bearing on said bolster adapted to limit tilting movement of the car body relative to the truck, and flat pads of rubber-like material supporting said bolster and located directly below said side bearing and said bolster center plate and yielding in shear to lateral thrusts to accommodate movement of said bolster transversely of the truck relative to said frame.

EDWIN C. JACKSON.

REFERENCES CITED

The following references are of record in the file of this patent:

UNITED STATES PATENTS

| Number | Name | Date |
| --- | --- | --- |
| 35,410 | Bridges | May 27, 1862 |
| 714,672 | Cliff | Dec. 2, 1902 |
| 1,862,156 | Mussey | June 7, 1932 |
| 1,924,237 | Glascodine | Aug. 29, 1933 |
| 1,993,104 | Lamont | Mar. 5, 1935 |
| 2,099,031 | Neal et al. | Nov. 16, 1937 |
| 2,211,462 | Hobson | Aug. 13, 1940 |
| 2,211,463 | Hobson | Aug. 13, 1940 |
| 2,242,212 | Hankins | May 20, 1941 |
| 2,307,439 | White | Jan. 5, 1943 |
| 2,317,169 | Bartell | Apr. 20, 1943 |
| 2,321,845 | Nystrom et al. | June 15, 1943 |
| 2,371,621 | Harwick | Mar. 20, 1945 |

FOREIGN PATENTS

| Number | Country | Date |
| --- | --- | --- |
| 329,261 | Italy | Sept. 4, 1935 |
| 603,049 | Germany | Jan. 17, 1931 |